3,505,932
METHOD OF SEALING A CONTAINER

Robert E. Fogg, Lynn, Mass., assignor to Comstock & Wescott, Inc., Cambridge, Mass., a corporation of Massachusetts
Original application June 22, 1966, Ser. No. 559,534, Divided and this application Apr. 29, 1968, Ser. No. 760,367
Int. Cl. B31b 1/62
U.S. Cl. 93—39.1                                         5 Claims

ABSTRACT OF THE DISCLOSURE

A series of alternating dots and stripes of a sealing composition are applied to the flanged periphery of a fibrous cylindrical container body before the closure is applied and roll seamed.

---

Figure 1:
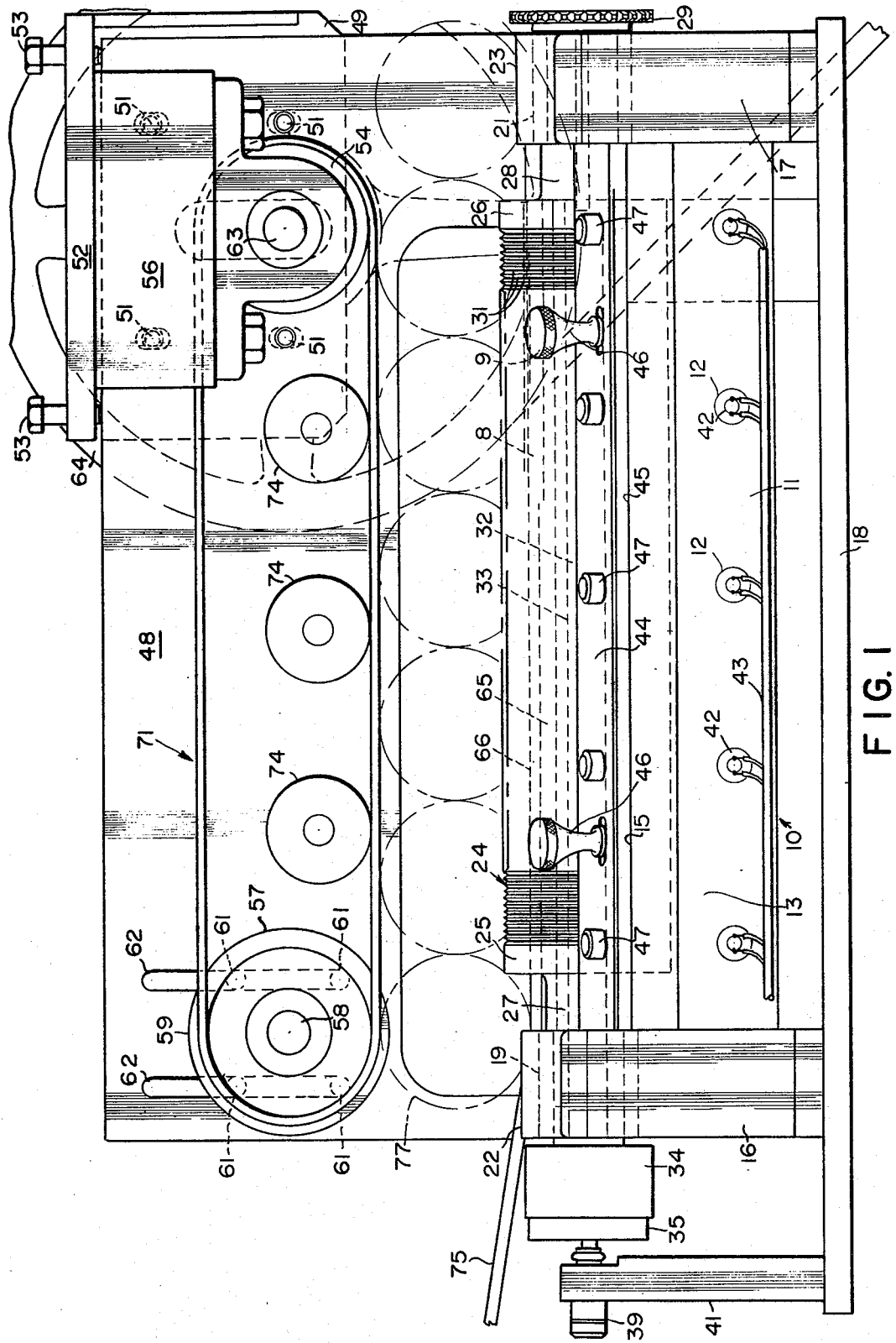

This application is a division of application, Ser. No. 559,534, filed June 22, 1966, now abandoned.

This invention relates to an apparatus for lining container bodies and, in one particular aspect, to the application of a sealing composition to the flanges of composite can bodies.

Composite cans are made from paper wound about a mandrel, with each successive turn laminated to the underlying turn. The winding may be either spiral or convolute. Usually an impervious liner forms the inside surface of the can. This liner may be either a plastic compostion or metal foil. The ends of a composite can are usually made of metal and are crimped on to the cut ends of the paper can body by a modification of the end-closing technique used in the manufacture of metal cans. As an alternative, ends formed of plastic materials may be used which are slipped on to the container body.

In the case of a composite can, in counter-distinction to that of a metal can, it may be advantageous to place the sealing composition on the flange of the can body rather than in the channel of the metal end. Placement of the sealing composition on the flange not only eliminates the rather difficult operation of placing the sealant high on the shoulder of the end, but the sealant can be so placed that it covers the cut end of the paper body and so prevents the entrance of moisture into the fibrous mass. As compared to the relatively stiff and well-formed flanges of a metal body, a flanged paper body is easily distortable and does not present the rigidity which allows a metal, e.g. a body hock, to accumulate a uniform deposit.

As is well understood, it is essential that the sealing composition, whether it be placed on the flange of a can or in the channel of an end be uniform. If it is not, the heavy pressure of the closing rolls causes difficulties which include squeezing (the extrusion of composition beyond the confines of the end seam), or even malformation or distortion where a local excess of sealing composition builds up so much pressure during closing that either the metal of the end or the can body is cut or broken.

In the case of closures for composite containers, an uneven deposit of sealing composition is even more serious than in the case of a metal can, for the soft paper body can be cut through very easily if pressures rise to a great degree. In consequence of the soft and rather distortable nature of the body of a composite can, obtaining a uniform deposit about the whole extent of the flange presents a difficult problem.

It has been discovered that if the sealing composition is carried to the flange of a composite can in intaglio rather than as a surface film of sealant, the deposit delivered is very uniform and that the uniformity is maintained from body to body throughout very long runs. As a consequence, the end-seaming operation which crimps the metallic closures on a composite body becomes far more dependable.

The manner by which these results are secured will become evident from the drawings and the following specifications.

Figure 2:
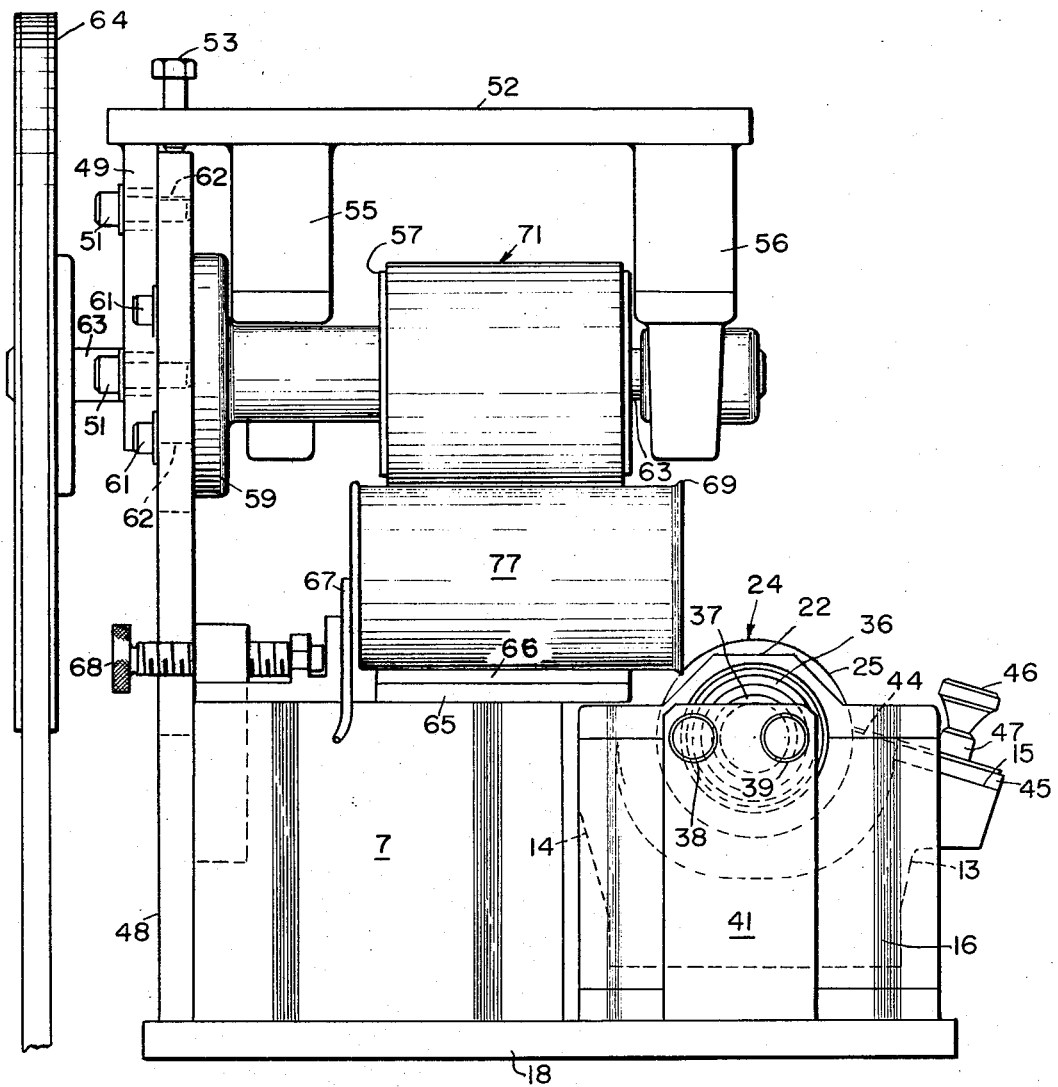
Figure 3:
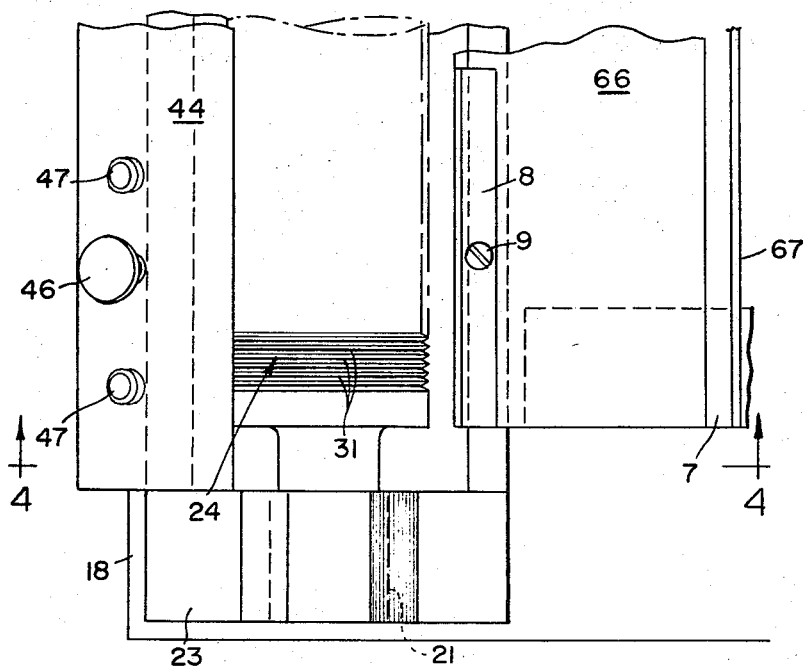
Figure 4:
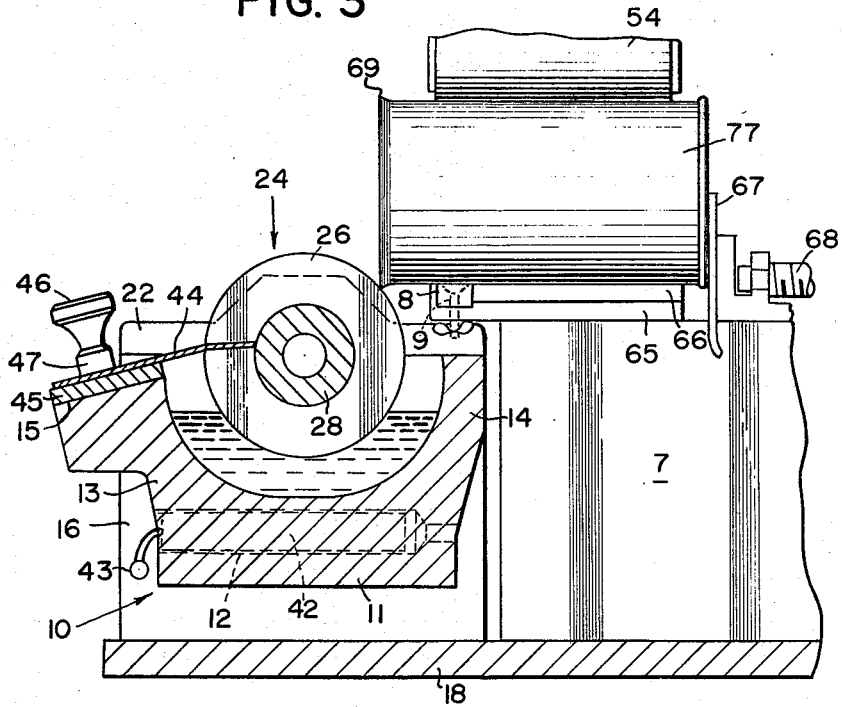

In the drawings:

FIG. 1 is a longitudinal elevation of the machine;
FIG. 2 is a side vertical elevation of the machine;
FIG. 3 is a partial top plan view of the melt box, doctor assembly, and can body guide rail;
FIG. 4 is a cross-section of the melt box and roll taken on the line 4—4 of FIG. 3.

In brief, the combination comprises a circumferentially grooved applicator roll mounted to dip into a bath of a sealing composition, a can body trackway parallel to the roll, and a drive-belt which engages the top surface of each can body as it passes through the divide and which rolls the can bodies with their axes normal to the axis of the applicator roll through the machine.

The applicator roll bears a circumferentially grooved surface which may take the form of a continuous groove which runs from one end of the roll to the other, or the surface may be formed of a multiplicity of spaced, independent grooves. An adjustable doctor blade is adapted to bear on the grooved surface of the roll to regulate the amount of composition which is picked up by the roll and transferred to the flange of a container. By spacing the blade a short distance from the lands of the roll surface, a deposit of sealing composition is obtained which consists of a series of alternating dots and stripes, each of which is connected to the other. The dots correspond to that volume of composition which is contained within the grooves, and the strips conform to that portion of the composition which remains on the lands. As the can bodies pass through the machine, the body flanges just touch the applicator roll. Consequently, the amount of sealing composition which is deposited on the flange is only that amount which is picked up from within the groove coupled with the portion which remains on the lands. As the can body rolls, the volume of sealant which is deposited on the flange is extraordinarily constant, and this constancy of deposit persists from can body to can body throughout prolonged runs.

A specific description of the apparatus follows.

The melt box

Melt box 10 is formed from a suitable metal, such as heavy aluminum casting, having a thick base section 11 in which a plurality of bores 12 are formed to receive cartridge type electric heaters.

Upstanding walls 13 and 14 rise from the base 11. Wall 13 has an inclined end-face 15 finished to form a seat for the doctor blade assembly later to be described.

The ends of the melt box are closed by two substantial main bearing blocks 16 and 17 which are bolted or otherwise fixed to the ends of the melt box body 10 as well as to a sub-base 18. Each of the bearing blocks 16 and 17 is machined to receive the bearing bushings 19 and 21. The blocks are capped by the bearing caps 22 and 23.

Roll 24 which rotates partially within the melt box 10 is formed from aluminum or other good thermally-conductive metal and terminates at each end in steel roll-ends 25 and 26 each of which bears outward shaft extensions 27 and 28 turned to form the roll shafts which fit within the bearing bushings 19 and 21.

Drive sprocket 29 attached to the remote end of shaft 28 supplies power to the roll. The adjustable speed driving motor and drive chain are not shown.

The face of roll 24 bears a plurality of grooves 31 which, as an example, may be a V-groove of 60° angle, .026 deep, .031 wide, and at center distances of .0625. The best dimension is primarily dependent on the "grab" and viscosity of the sealing composition. The linear distance between the first and the last groove in the face of the roll to which the periphery of a can body is exposed must equal at least the circumferential distance around the flange of the can body. This can be accomplished by limiting the length of the roll to the circumference of a specific can body, but it is better accomplished by providing lifter bar 8 (FIG. 1) which may be adjustably positioned by bolt 9 to engage the lower advancing quadrant of a can body and to lift the can body from the roll 24 when one body revolution is complete.

Both the shaft extensions and the roll are bored axially at shown at 32 to give housing-space for a tubular cartridge heater 33. The small diameter bore, drilled through the shaft extensions 28, provides means for driving out the cartridge heater 33 should it fail.

The outboard end of shaft 27 carries a cap 34 on the outer face to which is fastened an insulating disc 35 in which two concentric slip rings 36 and 37 (FIG. 2) are embedded. Slip rings are in electrical contact with the terminals of the cartridge heater 33. Current for the heater is brought to the slip rings through two brushes 38 and 39 which are supported by a stanchion 41 fastened to the sub-base 18. Cartridge heaters 42 in the base of the melt box, and the cartridge heater 33, supplying heat to the roll, are connected in parallel to the energy source through the cable 43. Conveniently, adjustment of roll and melt-box temperature is secured by thermostats (not shown), one responsive to the roll and the other to the melt-box temperature.

Doctor blade 44 is supported on a sliding block 45 which, in turn, is supported by the end face 15 and may be adjusted to bear against the roll by the eccentric thumb screw 46 which passes through block 45. The blade is locked by a number of cap screws 47.

Sub-base 18 supports a vertical backplate 48 which affords overhead support to the rolls and belt which move the can bodies through the machine.

A height adjustment which permits the machine to be set for the exact diameter of the cans is provided by a short supporting plate 49, which is held to the backplate 48 by cap screws 51 (FIG. 2). The screws pass through slots cut in the backplate. Top plate 52 is welded to the supporting plate 49. Cap screws 53, passing through the top plate 52 and bearing on the top surface of backplate 48, aid in the accurate adjustment of height.

Belt-drive pulley 54, is supported by two hanger-type bearings 55 and 56, which are welded to the top plate 52. The idler end of the belt is supported by idler pulley 57, of which the shaft 58 is supported by a flange 59 bolted to the inside face of backplate 48 by the cap screws 61—61. Up-and-down adjustment is provided by slots 62—62 (FIG. 1) cut in backplate 48 which allow the flange 59 to be moved up and down.

Belt-drive pulley support shaft 63 extends through a slot in backplate 48. The power drive pulley 64 is fastened to the outboard end of shaft 63 and receives power through a V-belt from a driving motor (V-belt and motor are not shown).

Backplate 48 together with an inboard leg member 7, support a table 65. A sponge rubber pad 66 covers that portion of the table 65 on which the can bodies may roll. A vertical guide rail 67 is transversely adjustable to position the rear end can body flange and thus bring the forward end can flange 69 into light contact with the upper lefthand quadrant of the roll 24. Adjustment is secured by thumb screw 68. Further adjustments of the guide rail 67, table 65 and pad 66 may be made to raise and/or lower the can bodies and thus change the position of placement of the sealants on the flange.

An endless rubber belt 71 is stretched between idler pulley 57 and the belt drive pulley 54. Optionally free-floating idler rolls 74 which bear on the inner surface of the lower flight of belt 71 may be arranged to hold the belt in contact with can bodies which pass through the machine by rolling down an inclined trackway 75. On entrance, the can bodies are immediately engaged by the belt 71 which carries them to an exit chute (not shown), rolling the bodies along the top surface of the sponge rubber pad 66 as the belt progresses. The yielding surface of the pad 66 cushions the belt pressure and prevents can bodies from being distorted.

Operation

The operation of the machine is as follows:

Can bodies enter the machine by rolling by gravity down the inclined trackway 75. As soon as a can body enters the machine, it is accurately positioned, since the back flange of the can body bears against the guide rail 67. The inboard body flange 69 then bears very lightly on the surface of the upper left-hand quadrant of the roll 24. At this moment, the can body 77 begins to rotate, because it is seized by the belt which is moving from left to right (FIG. 1). A small and predictable amount of composition detaches itself from that mass of material contained in a groove 31 and the lands and is deposited on the cut end and outer surface of the flange 69. As the can body revolves further in its passage through the machine, each succeeding groove permits a small dot of composition and each land transfers a stripe of composition to be deposited on the flange periphery. Accordingly, as the can body leaves the device, the entire periphery has received a succession of alternating small dots and stripes of composition.

The results contrast to a marked degree to those obtained when the flange bears against a smooth surface on which a film of molten sealing composition exists. In the latter case, very small differences in the stiffness of the board result in quite large variations in the amount of "plowing" and, especially with composite container bodies, a non-uniform deposit of sealing composition results.

The foregoing description applies to the machine when used with hot melt container sealing compositions which usually are based on thermoplastic polyamides and polyesters. There are, however, certain types of composite containers which withstand abuse better, such as dropping a can on the floor, if the container sealing composition is rubbery in its physical nature, such as solvent-based or water-based rubber compositions.

The present machine may be adapted to coat can flanges with these rubbery compositions merely by shutting off the electrical heaters and applying the compositions at room temperatures.

EXAMPLE I

The composite bodies of No. 202 fruit juice cans were coated by the machine on the edge of the flange with container sealing composition with a "rubber base" dissolved in a mixture of 90 parts toluene, and 10 parts xylene. Application was at room temperature. Total solids in the composition were 7.8%, its viscosity using a #3 Brookfield spindle at 60 r.p.m. at room temperature was 1000 cp. The solids picked up on the flange averaged one mg.

EXAMPLE II

The flanges of a series of No. 401 motor oil composite containers were coated with the apparatus of this invention with about 10 mg. of a sealing composition containing a styrene-butadiene-acrylonitrile terpolymer dissolved in a mixture of 90 parts toluene and 10 parts xylene. The containers were filled with dried peas in a weight equivalent to the weight of one quart of oil, and metal ends with and without a sealing composition in the end sealing periphery were seamed onto the containers. The seamed containers were dropped three times to determine their resistance to abuse. The containers were tested by admitting compressed air through one end and immersing the opposite end in a dish of water. The pressure at which the container leaked was determined by the appearance of bubbles in the water. Following recordation of the leak pressure, the pressure was raised until the ends blowoff. The results of the tests are as follows:

| Test container | Leak pressure (p.s.i.) | Blowoff pressure (p.s.i.) |
|---|---|---|
| Container having no sealing composition on both the flange of the container body and the metal end | 4 | 24 |
| Container having a sealing composition on the flange portion of the body (no sealing composition in the metal end) | 6 | 24 |
| 78 mg. of rubber sealing composition in the metal end only (no sealing composition on the flange of the container body) | 10–22 | 25 |
| Rubber sealing composition on both the flange and the metal ends | 20+ | 26 |

It is noted that containers having a sealing composition on both the flange and the metal ends had a minimum leak pressure of 20 lbs. and a minimum blowoff pressure of 26. This represents an improvement over those containers which had a sealing composition in either the metal end or the flange end only.

EXAMPLE III

One mg. of a sealing composition containing a styrene-butadiene-acrylonitrile terpolymer dissolved in a mixture of 90 parts toluene and 10 parts xylene was applied to the flanges of a series of No. 202 citrus fruit juice composite containers. The containers were filled with dyed ethylene glycol and were seamed with metal ends having no sealing composition in the sealing margin of the end. The seamed containers were stored at room temperature, and no leakage was observed in one week. It is noted that the application of the sealing composition to the flange of this composite container body alone was sufficient to effect a satisfactory seal. This presents an economic advantage in that no sealing composition is necessary in the metal end.

EXAMPLE IV

The flanges of a series of No. 401 motor oil composite containers were coated with 9 and 13 mg. of a sealing composition containing a styrene-butadiene-acrylonitrile terpolymer dissolved in a mixture of 90 parts toluene and 10 parts xylene. The containers were filled with dyed ethylene glycol and were closed with metal ends containing a rubber sealing composition. After storage for three weeks at 120° F., no leakage was detected.

EXAMPLE V

The flanges of a series of No. 401 motor oil composite containers were coated with this apparatus using a polyamide-type hot melt sealing compositioin. The contents were sealed with metal ends and heated to 190° F. The sealed containers were then tested for leakage and end blowoff as described in Example II. The results of the films under closing roll pressures.

| Test container | Leak pressure (p.s.i.) | Blowoff pressure (p.s.i.) |
|---|---|---|
| No sealing composition in either the metal end or the flange of the container body | 6 | 25 |
| 200 mg. of sealing composition on the flange only (no sealing composition in the metal end) | 8 | 24 |
| 62 mg. of sealing composition on the flange (no sealing composition on the metal end) | 8 | 27 |

This example illustrates the fact that approximately 62 mg. of sealing composition on the flange only is sufficient to form as effective seal. When the sealing composition on the flange is increased to 200 mg., this amount interferes with the proper formation of a seam as evidenced by the low blowoff pressure.

Many thermoplastic sealing compositions possess sufficent plasticity so that when the end is seamed on the coated flanges produced by this machine, the pressure of the closing rolls is sufficient to cause the sealing composition to flow into a continuous film. Certain sealing compositions of the thermoplastic type may, however, give better performance if the can end is heated approximately to the melting point of the thermoplastic at the moment that it is seamed to the end. Rubber base sealing compositions will flow and form continuous films under closing roll pressures.

Although the machine and the method of sealing containers which herein have been disclosed have special advantage in the sealing of composite containers, it is obvious that the machine and the method can be used on containers which do not present difficulties associated with composite can bodies. For example, plastic can bodies can be successfully "lined" on the machine, and metallic can bodies may be lined with equal success.

The machine has a rapid through-put and easily keeps pace with the output of a composite can body maker. Because of the uniformity of the deposit of sealant which it leaves on the flange, the machine eliminates numerous production difficulties which have been associated with prior methods of applying sealant to a composite can end. In addition, by coating the ragged edges of the flange the container is effeovisly sealed against overflow and spoilage. The coating also stiffens the flange and thus permits easier assemblage of a metal end to the container body.

I claim:

1. The method of sealing containers which includes applying predetermined amounts of a container sealing composition as a series of alternating dots and stripes connected to each other about the entire periphery of the body flange of a container, applying a container end closure to the coated body flange and roll-seaming the said end to the container body, whereby pressure developed in the roll-seaming operation spreads the sealing composition into a continuous sealing film.

2. The method of sealing composite containers, the said containers having a fibrous body portion and metallic ends, which includes flanging the ends of the body portion and then applying to the said flanges a plurality of alternating dots and stripes connected to each other of a plastically-deformable container sealing composition, subsequently applying an end closure to the coated flange, and roll-seaming the said closure on to the said container body, whereby pressure developed by the seaming rolls causes the sealing composition to spread into a continuous band of sealing material interposed between the said closure and the container body.

3. The method of claim 1 wherein the container end closure is heated and at the moment of roll-seaming, the said closure is at a temperature in excess of the melting point of the container sealing composition.

4. The method of claim 1 wherein the said container sealing composition is thermoplastic and is applied to the said body flange while the said sealing composition is molten.

5. The method of claim 1 wherein the sealing composition is a solvent solution of a rubber-like elastomer and is applied to the body flange of a container in solvated form.

References Cited

UNITED STATES PATENTS 3,322,045  5/1967  Tanona _____ 93—39.1

BERNARD STICKNEY, Primary Examiner

U.S. Cl. X.R.

118—215